(12) United States Patent
Howard et al.

(10) Patent No.: US 10,200,378 B2
(45) Date of Patent: Feb. 5, 2019

(54) SYSTEMS AND METHODS FOR ACCESS TO ELECTRONIC DATA

(71) Applicant: Walmart Apollo, LLC, Bentonville, AR (US)

(72) Inventors: Brandon Everett Howard, Bentonville, AR (US); Steven Jackson Lewis, Bentonville, AR (US); Ian Stansell, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 33 days.

(21) Appl. No.: 15/443,706

(22) Filed: Feb. 27, 2017

(65) Prior Publication Data
US 2017/0250992 A1    Aug. 31, 2017

Related U.S. Application Data

(60) Provisional application No. 62/300,533, filed on Feb. 26, 2016.

(51) Int. Cl.
*H04L 9/00*    (2006.01)
*H04L 29/06*    (2006.01)
(Continued)

(52) U.S. Cl.
CPC ............ *H04L 63/102* (2013.01); *G06F 9/452* (2018.02); *H04L 63/083* (2013.01); *H04L 67/02* (2013.01);
(Continued)

(58) Field of Classification Search
CPC . H04L 63/102; H04L 63/083; H04L 67/2852; H04L 67/2842; H04L 67/42;
(Continued)

(56) References Cited

U.S. PATENT DOCUMENTS 7,562,113 B2    7/2009    Labarge et al.
8,087,033 B2 *  12/2011   Sojan .................... G06F 3/0482
                                                          715/827
(Continued)

FOREIGN PATENT DOCUMENTS

JP    2003006202 A    1/2003

OTHER PUBLICATIONS

Zambelli, Philipp, Shared Bookmarks: Building an Application on a Distributed Object System, Mater's Thesis in Telematics for the Award of the Academic Degree Diplom Ingenieur at the Graz University of Technology, Dec. 1999.

(Continued)

*Primary Examiner* — Beemnet W Dada
(74) *Attorney, Agent, or Firm* — McCarter & English, LLP; David R. Burns

(57) ABSTRACT

Systems, methods, and machine readable medium are provided for improving access to electronic data. An application is provided that generates a graphical user interface on a first client device requesting the server-based application via a web browser on the first client device. Credentials from a user of the first client device. After authorization of the user credentials, input from the user is received via the graphical user interface indicating an URL for a website, a file path for a document, and text. The entered input is stored in a local browser cache on the first client device and in a remotely-located database as being associated with the user credentials. Subsequently, a display is generated on the first client device, by the application, of electronic data related to the entered input.

19 Claims, 11 Drawing Sheets

(51) Int. Cl.
*H04L 29/08* (2006.01)
*G06F 9/451* (2018.01)
*G06F 17/30* (2006.01)

(52) U.S. Cl.
CPC ...... *H04L 67/2842* (2013.01); *H04L 67/2852* (2013.01); *H04L 67/42* (2013.01); *G06F 17/30864* (2013.01); *H04L 67/306* (2013.01)

(58) Field of Classification Search
CPC ... H04L 67/306; G06F 9/452; G06F 17/30864
See application file for complete search history.

(56) References Cited

U.S. PATENT DOCUMENTS

| | | | |
|---|---|---|---|
| 8,739,020 | B2 | 5/2014 | Khosla et al. |
| 8,863,246 | B2 * | 10/2014 | Norman ................. G06F 21/31 |
| | | | 713/168 |
| 8,990,220 | B2 | 3/2015 | Wu |
| 9,471,699 | B2 * | 10/2016 | Brooks ............. G06F 17/30884 |
| 9,703,883 | B2 * | 7/2017 | Brooks ............. G06F 17/30884 |
| 9,977,831 | B1 * | 5/2018 | Raichur ............ G06F 17/30861 |
| 2002/0099784 | A1 | 7/2002 | Tran |
| 2008/0086471 | A1 | 4/2008 | Ritter et al. |

OTHER PUBLICATIONS

Price, Geoffrey P., et al, Aligning Web-based Toold to the Research Process Cycle: A Resource for Collaborative Research Projects, Journal of Interactive Online Learning, vol. 11, No. 3, Winter 2012.

* cited by examiner

| User Stored Electronic Data | Type link | Double byte | Metadata | Metadata | Shared Access |
|---|---|---|---|---|---|
| Data tem 1 | Plugin 1 | Yes | Credentials 1 | Cookies 1 | |
| Data Item 2 | Plugin 2 | | Credentials 2 | Cookies 2 | |
| Data Item 3 | | | Proxy address | Cookies 3 | User 1 |
| Data Item 4 | | Yes | | | |
| Data Item 5 | | | | | User 2 |
| Data Item 6 | | | | | |
| Data Item 7 | | Yes | | | |

FIG. 8

SYSTEMS AND METHODS FOR ACCESS TO ELECTRONIC DATA

RELATED APPLICATION

This application claims priority to U.S. Provisional Patent Application No. 62/300,533 filed on Feb. 26, 2016, which is hereby incorporated by reference in its entirety.

BACKGROUND

Electronic data plays a vital role in the modern world. However, the data is only of use if it is accessible. Many times people forget where data is located or how it can be accessed. At other times devices fail and access to the data is lost altogether. Regardless of the reason, inaccessible data negatively affects user and computing system performance.

BRIEF SUMMARY

In one embodiment, a method, a system, and non-transitory computer readable medium are provided to improve access to electronic data. The embodiment includes providing a server-based application that generates a graphical user interface for display on a first client device that requested the server-based application via a web browser included on the first client device, receiving credentials from a user of the first client device with the graphical user interface, receiving, after an authorization of the user credentials, input from the user of the first client device via the graphical user interface where the graphical user interface is configured to accept input indicating an URL for a website, a file path for a document, and text, storing the entered input in a local browser cache on the first client device and in a remotely-located database where the input stored in the remotely located database is associated with the user credentials, and subsequently providing a display generated by the server-based application of electronic data related to the stored input.

In another embodiment, the stored input is accompanied by a user-supplied description. In another embodiment, the user credentials include a username and password. Some embodiments also include generating the graphical user interface on a second client device that requested the server-based application, receiving the user credentials of the user of the first client device via the graphical user interface on the second client device, querying the database to retrieve data associated with the user credentials, and providing a display generated by the server-based application of the retrieved data on the second client device.

In another embodiment, where the stored input is an URL for a website and the subsequent display of data includes a control button that launches the website in response to a selection of the control button. In another embodiment, where the entered input is a file path for a document and the subsequent display of data includes a control button that opens the document in response to a selection of the control button. In another embodiment, where the entered input is text and the subsequent display of data includes a control button that displays the text in response to a selection of the control button.

Some embodiments also include determining that the browser cache has reached a memory limit, clearing data stored in the browser cache based on the determining, and storing a database key in the browser cache, the database key pointing to a record where the cleared data is stored in the remotely-located database. Some embodiments also include receiving user credentials via the graphical user interface on the first client device, and retrieving data from the remotely located database and storing it in the browser cache of the first client device to replace missing data.

BRIEF DESCRIPTION OF THE DRAWINGS

The accompanying drawings, which are incorporated in and constitute a part of this specification, illustrate one or more embodiments of the invention and, together with the description, help to explain the invention. The embodiments are illustrated by way of example and should not be construed to limit the present disclosure. In the drawings:

FIG. 8 illustrates an exemplary data structure 800 for the electronic data access system, according to an example embodiment.

DETAILED DESCRIPTION

Figure 1:
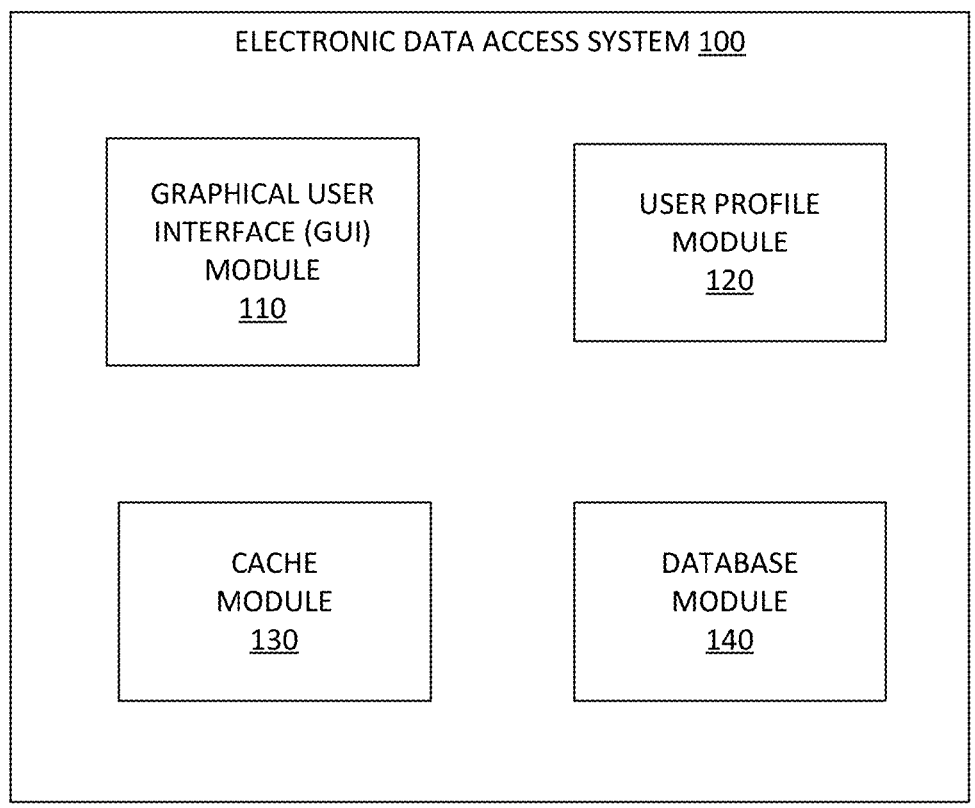
FIG. 1 is a block diagram showing an electronic data access system in terms of modules, according to an example embodiment.

Systems, methods, and computer readable mediums are described herein for an electronic data access system and application. Example embodiments provide an application that generates a graphical user interface for display on a client device that is capable of receiving user credentials, and is configured to accept input from the user relating to an URL for a website, a file path for a document, and text for notes. The electronic data access system further stores the entered input in both a local browser cache and in a remotely-located database for later retrieval. In response to receiving the entered input, the application generates a display or a graphical control element in the user interface of the electronic data related to the entered input.

The electronic data access system described herein enables a user to efficiently store and access relevant links, documents, and notes; access relevant links, documents, and notes across multiple machines; allow others to access links, documents, notes, and templates; and allow recovery of all stored links after a hardware change or replacement. The electronic data access system improves user productivity by organizing data and providing easy access to the data.

One approach to increasing the ease of access to data is to create "bookmarks" for websites in the web browser of a computing device to help a user access the website more easily. However, while helpful, these bookmarks disappear or are lost when people change computers or when the data on the computer is erased or deleted. To solve the problem of losing data, the electronic data access system provides an application (which may be referred to hereafter as "electronic data access application") to allow a user to enter a link to a document, link to a website (i.e. an URL) or enter text, and supply a description for the linked resource or text. The application is a web-based application or a server-based application. The links and text may be stored in the user's device browser cache and also stored in a database remotely located from the user's device. In one embodiment, the user may access the application from another device and retrieve the stored links or text from the database. The user may also access the electronic data access application from his or her own device and retrieve the stored links or text from the device's web browser cache. Alternatively, the user may enter his or her credentials in the electronic data access application to enable other users to see the stored links and other data.

Conventional systems require an administrator to save links to resources on a central system so that a user can have access to it. The electronic data access application described herein is a self-service system for which a user does not require assistance from an administrator or software developer to save links text. Users also have access to their stored data that is protected with the user's credentials.

In conventional systems browser favorites and bookmarks are not saved when a device's memory is replaced or if the software is reinstalled. The electronic data access system described herein allows a user to always have access to their saved links and data even when the device memory is replaced or the software is reinstalled. The application also creates a button in the user interface to access the document, website or text associated with the stored data.

Figure 5:
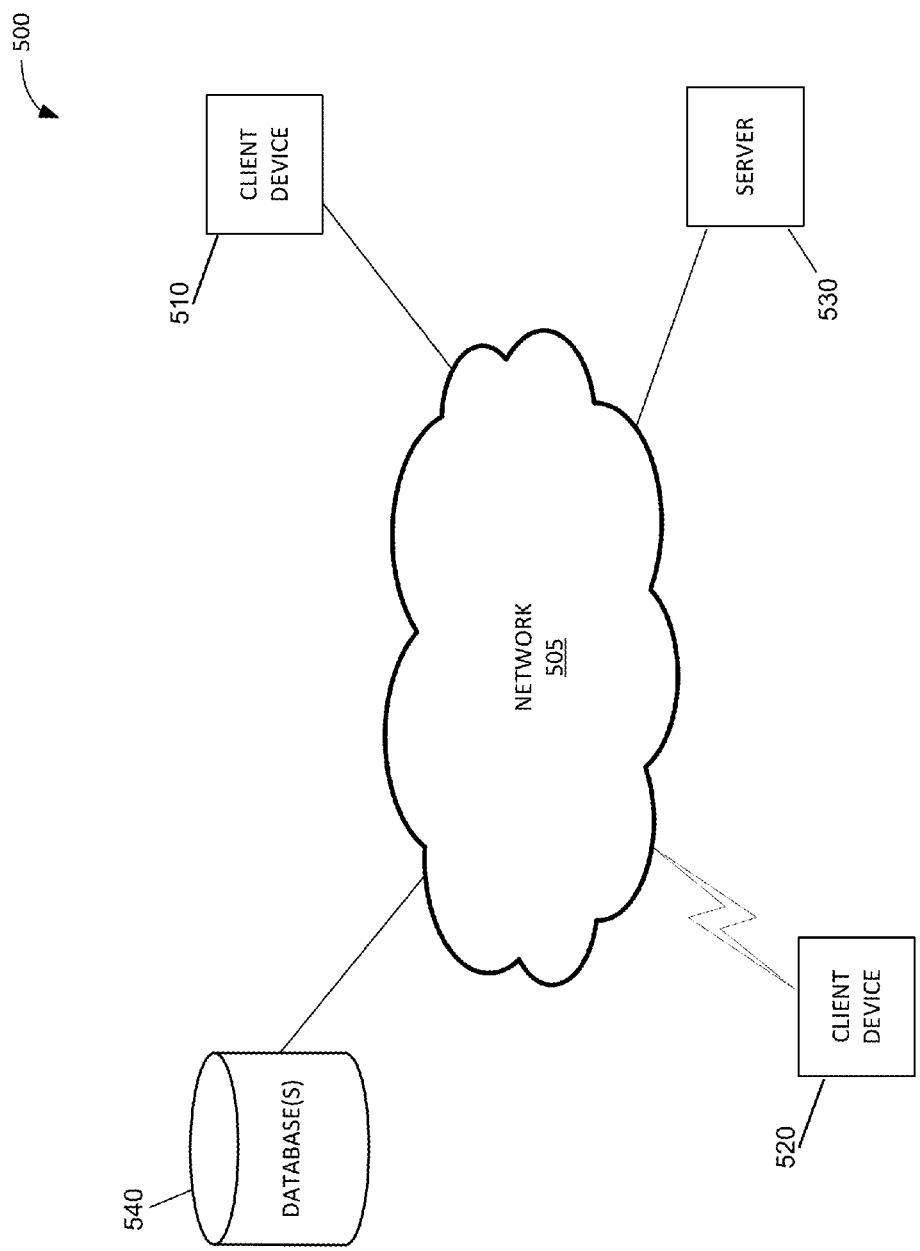
FIG. 5 is a diagram of an exemplary network environment suitable for a distributed implementation of exemplary embodiments.

FIG. 1 is a block diagram 100 showing an electronic data access system in terms of modules according to an example embodiment. In one embodiment, the electronic data system of the present invention includes a web (or server)-based electronic data access application that utilizes a client device web browser as a presentation tier supporting a graphical user interface while a remotely located server and database support an application tier and storage tier. The one or more of the modules may be implemented using client device 510, 520 server 530 and/or database 540 as shown in FIG. 5. The modules include a graphical user interface (GUI) module 110, a user profile module 120, a cache module 130, and a database module 140. The modules may include various circuits, circuitry and one or more software components, programs, applications, or other units of code base or instructions configured to be executed by one or more processors. In some embodiments, one or more of modules 110, 120, 130, 140 may be included in server 530, while other of the modules 110, 120, 130, 140 are provided in client device 510 or 520. Although modules 110, 120, 130, and 140 are shown as distinct modules in FIG. 1, it should be understood that modules 110, 120, 130, and 140 may be implemented as fewer or more modules than illustrated. It should be understood that any of modules 110, 120, 130, and 140 may communicate with one or more components included in system 500 (FIG. 5), such as client device 510, client device 520, server 530, or database(s) 540.

The GUI module 110 may be configured to generate and manage a graphical user interface being displayed on a client device, receive and manage input from a user via the user interface, transmit data for display data in the user interface, and manage control buttons on the user interface. The user profile module 120 may be configured to generate and manage user profiles, including user credentials, and associating user input and links with a particular user profile. The cache module 130 may be configured to manage and store data in local browser cache of a client device. The database module 140 may be configured to manage and store data in a remotely located database.

Figure 2:
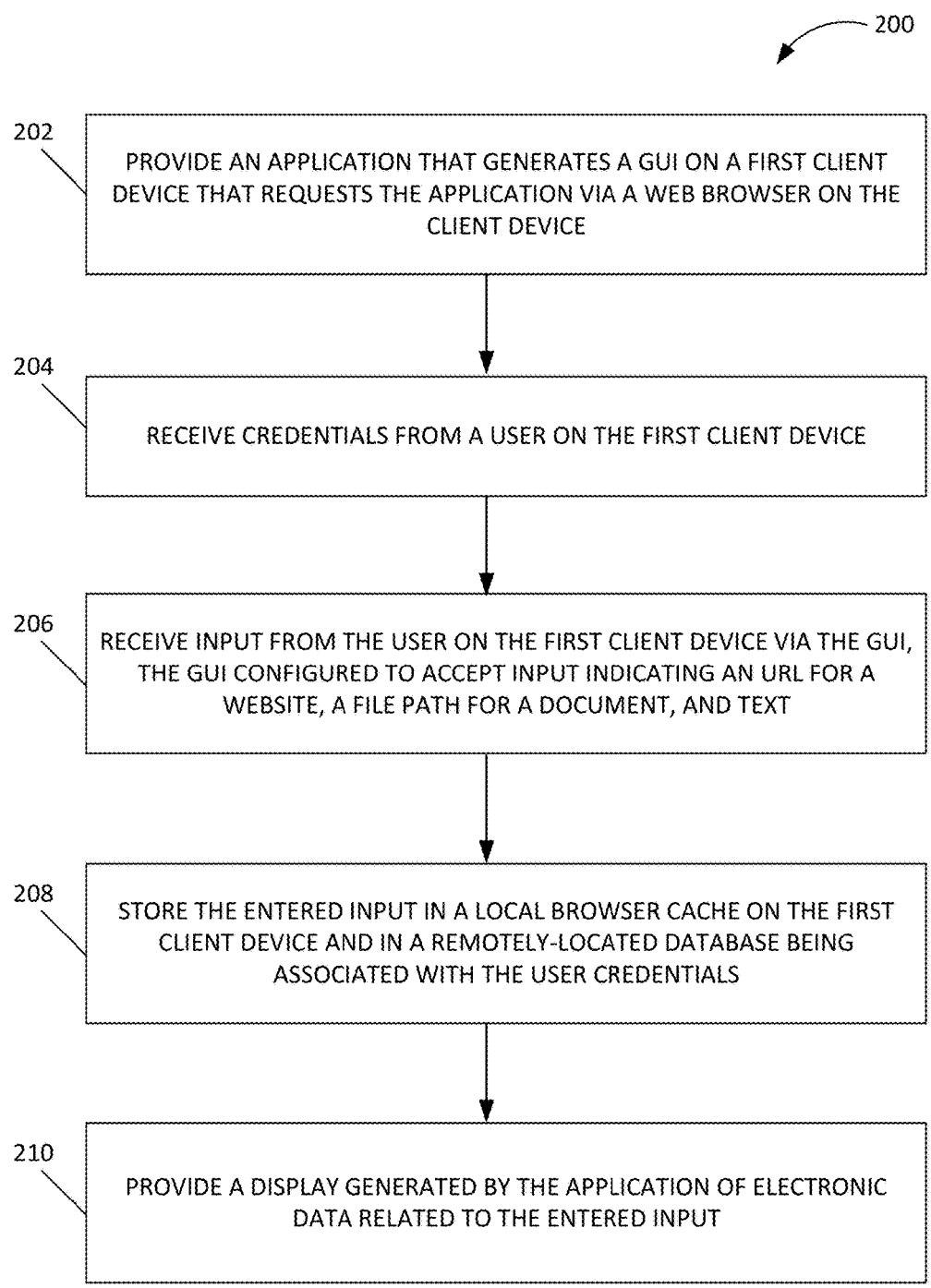
FIG. 2 is a flowchart illustrating an exemplary method for providing access to electronic data, according to an example embodiment.

FIG. 2 is a flowchart illustrating an exemplary method 200 for providing improved access to electronic data, according to an example embodiment. The method 200 may be performed using or one or more modules of system 100 described above.

The exemplary method 200 begins at step 202 by providing an electronic data access application that generates a graphical user interface on a first client device that requests the application via a web browser on the first client device. The application may be a server-based application. In another example embodiment, the application may be a web-based application. The user interface is generated by the GUI module 110.

At step 204, the GUI module 110 receives credentials from a user on the first client device. The user can enter his or her credentials (e.g., username and password) via the user interface generated on the first client device. The user profile module 120 may determine a corresponding user profile based on the credentials entered by the user. The GUI module 110 may generate a user interface based on the user profile associated with the user credentials. The user profile may include previously stored entered input that is retrieved from the local browser cache or the remotely-located database. In one embodiment, the local browser cache may always be searched for stored data with the remotely-located database only being searched if the local browser cache search is unsuccessful at finding any relevant data. In another embodiment, the remotely located database is always searched to supplement the data found in the local browser cache. In another embodiment, the remotely located database is only searched in response to a request submitted by a user through the graphical user interface.

The user profile module 120 performs an authorization of the user credentials by querying a database to ensure that the username and password combination are a match. After authorization of the user credentials (i.e. after determining a match), at step 206, the GUI module 110 receives input from the user on the first client device via the user interface. The user interface is configured to accept input relating to a Uniform Resource Locator (URL) that references a resource on the Internet, for example a website. The user interface is also configured to accept input relating to a local file path that references an internal location in a file system where a particular file is stored. The user interface is also configured to accept text (that is text other than an URL or file path) entered by the user. The text may correspond to notes that the user wants to store. The user may enter the inputs via a text field displayed in the user interface. In an example embodiment, the user may also enter a description associated with the input (URL, file path or text) that describes the input to the user.

At step 208, the cache module 130 stores the entered input from step 206 in a local browser cache on the first client device. An accompanying description that was entered with respect to the input may also be stored and cross-referenced with the input. Also at step 208, the database module 140 stores the entered input from step 206 in a remotely-located database. Again, any corresponding description that was entered may also be stored and cross-referenced with the input. The entered input is stored in the remotely-located database as being associated with the user credentials entered at step 204. The database is remotely-located with respect to the first client device. In another embodiment, the user may also be able to also store the entered input and any accompanying description in other data repositories (in addition to the browser cache and the remotely-located database) for persistently storing and making data available to other client devices. The entered input and accompanying description may be stored along with the user credentials in additional data repositories.

In some embodiments, the cache module 130 does not store the entered input in the local browser cache with reference to the user credentials because it may not be necessary for later retrieval. For example, the user may log in to the electronic data access application using the first client device, and the electronic data access application can retrieve the entered input from the local browser cache of the first client device without needing the user credentials.

At step 210, the GUI module 110 provides a display generated by the application of the electronic data related to the entered input. The display may be generated in response to a request received by the application or the user interface may automatically refresh to reflect the newly-stored data accompanying the display of references to previously stored data. The electronic data related to the entered input (from step 206) may be displayed in the user interface in the form of a control button that can be selected by the user. A description associated with the entered input may also be displayed adjacent or near the control button in the user interface. For example, in the case that the entered input is an URL, the user interface may include a control button that when selected or clicked launches the Internet resource associated with the URL. Thus the selecting or clicking on the control button may open or launch a website. In the case that the entered input is a file path, the user interface may include a control button that when selected or clicked opens the file stored or located at the file path. It will be appreciated that this latter circumstance where the input is a file path will occur most frequently when the electronic data access application is a server-based application deployed in an internal company network rather than a web-based application. In the case that the entered input is text, the user interface may include a control button that when selected or clicked displays the text in the user interface.

In an example embodiment, the method 200 further includes generating a graphical user interface on a second client device that requests the application. Credentials of a user of the first client device are received via the user interface. The electronic data access system 100 queries the remotely-located database to retrieve data associated with the user credentials and provides a display of the retrieved data on the second client device via the user interface generated on the second client device.

In one embodiment, in a first non-limiting example, a user logs in to the electronic data access application on a first client device using his or her credentials, enters an input via the user interface, and electronic data related to the entered input is displayed in the user interface. The user can log off the application, and return to the application (after some time or immediately), and log in the application again using his or her credentials. If the user logs in to the electronic data access application again on the first client device, then the electronic data access system 100 described herein retrieves data from the local browser cache of the first client device to display in the user interface. For example, the electronic data access system 100 retrieves data and displays corresponding control buttons in the user interface so that the user can easily access the corresponding electronic data. In this manner, a user can keep track of data or information that he or she needs on a regular basis, and easily access it by clicking on a button. In many instances, retrieving data from the local browser cache is faster than retrieving it from a database.

In a second non-limiting example, a user can log off the application on the first client device, and log in to the application on a second client device. In this case, the electronic data access system 100 retrieves data from the remotely-located database, based on the user credentials, to display in the user interface on the second client device.

Referring back to the first non-limiting example, where the user logs in to the application again on the first client device, the electronic data access system 100 may retrieve data from a remotely-located database if some or all of the data is not available in the local browser cache of the first client device. Alternatively, the electronic data access system 100 may retrieve data from the remotely located database as a supplement to the data retrieved from the local browser cache.

In an example embodiment, the method 200 further includes the cache module 130 determining that the local browser cache of the first client device has reached a memory limit. The memory limit may be predefined in the electronic data access application. In this case, the cache module 130 clears some or all of the data stored in the local browser cache, and stores a database key in the local browser cache that points to a record where the cleared data is stored in the remotely-located database. After each store or save action (i.e., storing the entered input and any accompanying description), the cache module 130 determines the approximate size of the browser cache. For example, the cache module 130 may use a Javascript command to determine the cache size. When the browser cache size is below a certain predefined limit, the cache module 130 clears the cache completely saving the data being cleared to the database. Alternatively, the cache module may only clear and optionally save only data that is infrequently used. The user can also manually clear the cache via input control buttons included in the graphical user interface. In this manner, when the local browser cache is full, the electronic data access system 100 can clear the cache without losing access to the data.

In another example embodiment, the method 200 further includes retrieving data from the remotely-located database and storing it in the local browser cache of the first client device to replace data missing from the local browser cache. When the user logs in the electronic data access application, the application checks the browser cache and the database for the stored records in each, and performs a sync if necessary. If there is a mismatch between the records stored and the browser cache is missing data that is stored in the remotely-located database, then the electronic data access system retrieves the missing data from the database and stores it in the browser cache. If there is a mismatch between the records stored and it is the remotely-located database that is missing data that is stored in the browser cache, then the electronic data access system retrieves the missing data from the browser cache and stores it in the remotely-located database. Data may be lost or missing because it may be updated to only one data store due to issues or complications with network connectivity, the remotely-located database, the browser, the client device, the cloud computing environment, etc.

In an exemplary embodiment, the electronic data access system 100 determines when the memory of the local browser cache is full or is substantially full, and automatically stores the entered input in the remotely-located database only (rather than storing in both—the local browser cache and the remotely-located database). In some embodiments, the electronic data access system 100 clears some or all of the data stored in the local browser cache and saves a database key that points to a particular record in the remotely-located database where data relating to a specific entered input is stored. Thus, when the application needs to retrieve the data, it is able to retrieve it from the database because the database key is already provided in the local browser cache. In some embodiments, the electronic data access system 100 clears an amount of data from the local browser cache based on the amount of storage space needed to store a database key.

In some embodiments, the user interface of the application displays a graphical control element indicating an amount of storage that is available in the local browser cache. As a non-limiting example, the graphical control element indicating the amount of storage available for the local browser cache may be a progress bar icon that is dynamically updated based on the memory storage of the local browser cache. In some embodiments, the user interface of the application includes a control button that when selected clears the data in the local browser cache. Thus, a user is able to manually clear data from the local browser cache when he or she desires or when the graphical control element indicates that the local browser cache memory is full or substantially full. In some embodiments, the user interface includes a control button or a graphical control element that when selected enables the user to view the data stored in the local browser cache.

In some embodiments, the user is able to share access to the electronic data with another user, for example, by transmitting data to the server 530 that associates the data with another user profile/user credentials, and when the other user logs in to the application, the user interface on his or her client device displays the shared electronic data in the form of a control button. In some embodiments, a user can specify whether a control button corresponding to the entered input is public or private. That is, the user can specify whether other users are able to see or access data associated with particular control buttons. Thus, a user may be able to share all of his or her control buttons displayed in the user interface, however, only the ones that are indicated by the user as public can be viewed and accessed by another user.

In an example embodiment, the electronic data access system allows an authorized user to add electronic data to another user's profile, which causes the system to display the electronic data in a user interface at the other user's device when the user accesses the system.

In some embodiments, a graphical user interface of the electronic data access application may include multiple control buttons and corresponding descriptions associated with various stored electronic data. In an example embodiment, a user is able to customize the layout of the multiple control buttons and the corresponding descriptions in the graphical user interface, for example, by dragging and dropping a displayed control button and corresponding description to a desired location within the user interface screen. The user may be able to save or store a customized layout as a template. In an example embodiment, the user is able to share the stored template with another user. The other user may be able to click a button that automatically customizes the layout of the control buttons and corresponding description on his or her user interface screen to match the layout stored in the template.

Figure 3A:
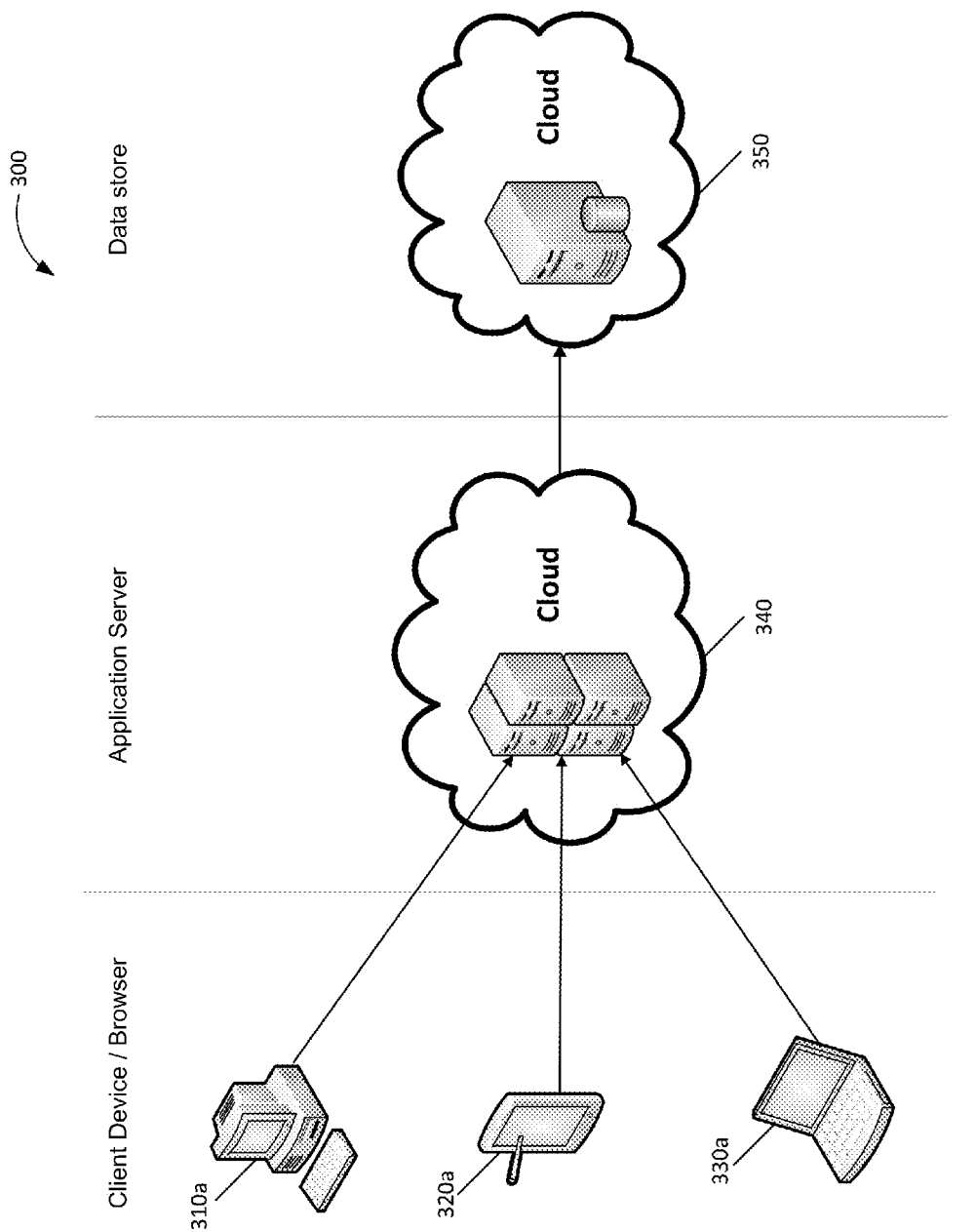
FIG. 3A depicts an example storage system for providing access to electronic data, according to an example embodiment.

FIG. 3A depicts an exemplary system 300 for providing access to electronic data, according to example embodiments. The system 300 may be implemented to store data and input entered by a user (described in connection with step 206 of FIG. 2 above). The system 300 includes multiple client devices, for example, client device 310*a*, client device 320*a*, and client device 330*a*, an application server 340, and a data store system 350. In an example embodiment, the application server 340 may be implemented as a cloud computing system. In an example embodiment, the data store system 350 may be implemented as a cloud computing system. As described above, a user can access the electronic data access application via the client device 310, 320, 330, and enter his or her user credentials via the user interface generated by the electronic data access application. The user can enter input relating to electronic data, such as URL, file path, or text, and enter a description via the client device 310, 320, 330. The entered input is saved in the client device's cache and is transmitted to the application server 340 with the user credentials. The entered input and the user credentials are stored in the data store system 350.

Figure 3B:
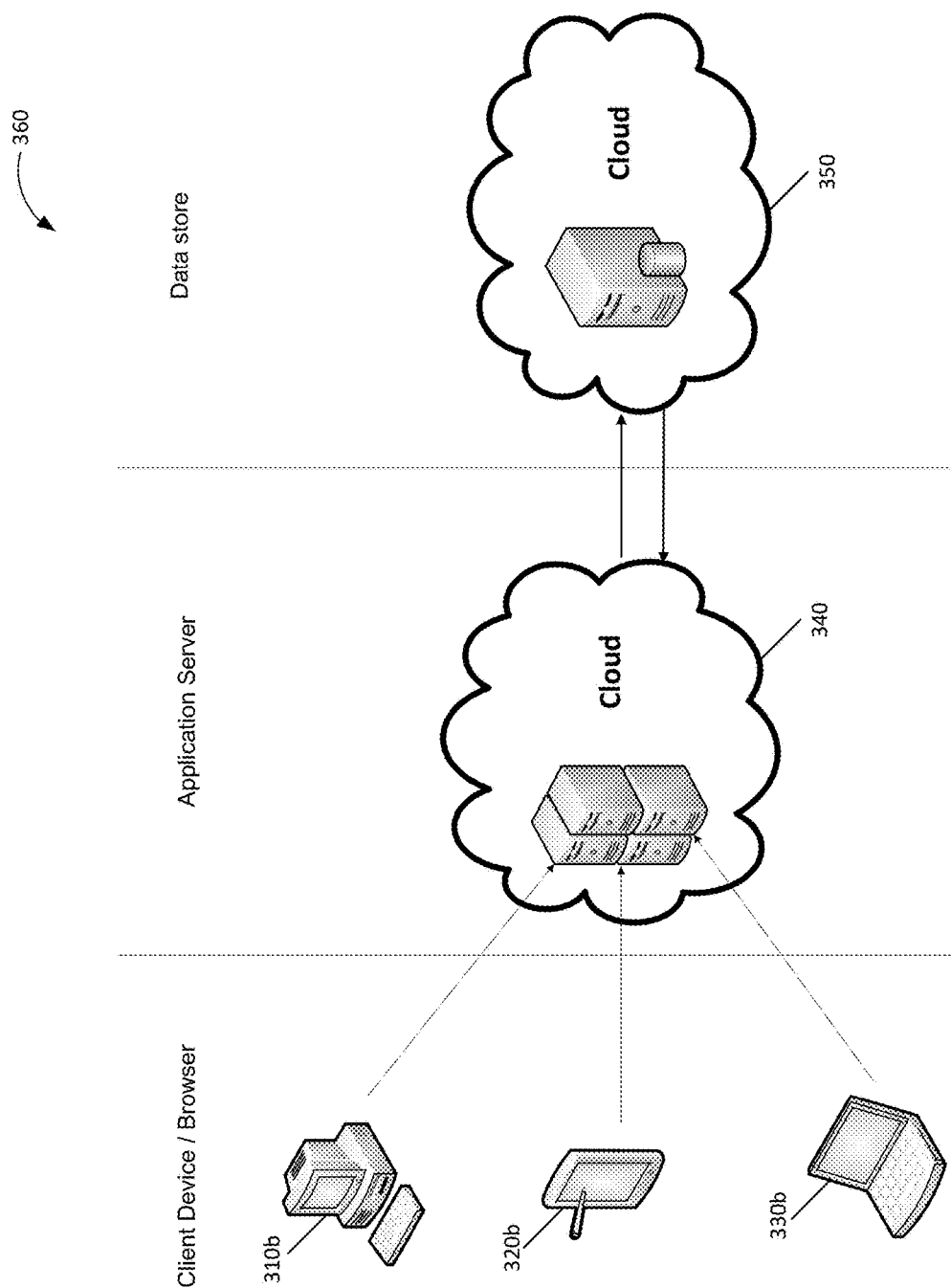
FIG. 3B depicts an example retrieval system for providing access to electronic data, according to an example embodiment.

FIG. 3B depicts an exemplary system 360 for providing access to electronic data, according to example embodiments. The system 360 may be a data retrieval system corresponding to the data storage system of FIG. 3A of the electronic data access system 100. The system 360 includes multiple client devices, for example, client device 310*b*, client device 320*b*, and client device 330*b*, the application server 340 of FIG. 3A, and the data store system 350 of FIG. 3A. In some embodiments, the client devices 310*b*, 320*b*, and 330*b*, may be the same as the client devices 310*a*, 320*a*, and 330*a*. As described above, a user can log in to the electronic data access application again via client device 310*b*, 320*b*, 330*b* by entering his or her user credentials. The application checks the client device's cache and the database to retrieve data related to the credentials entered by the user. As described above, if the cache does not have some or all of the data then the application server 340 requests data associated with the user credentials from the data store system 350. The data store system 350 queries a database, and retrieves and transmits data from the database associated with the user credentials to the application server 340. The application server 340 then forwards the retrieved data to the client device for storage in the local cache.

Figure 4A:
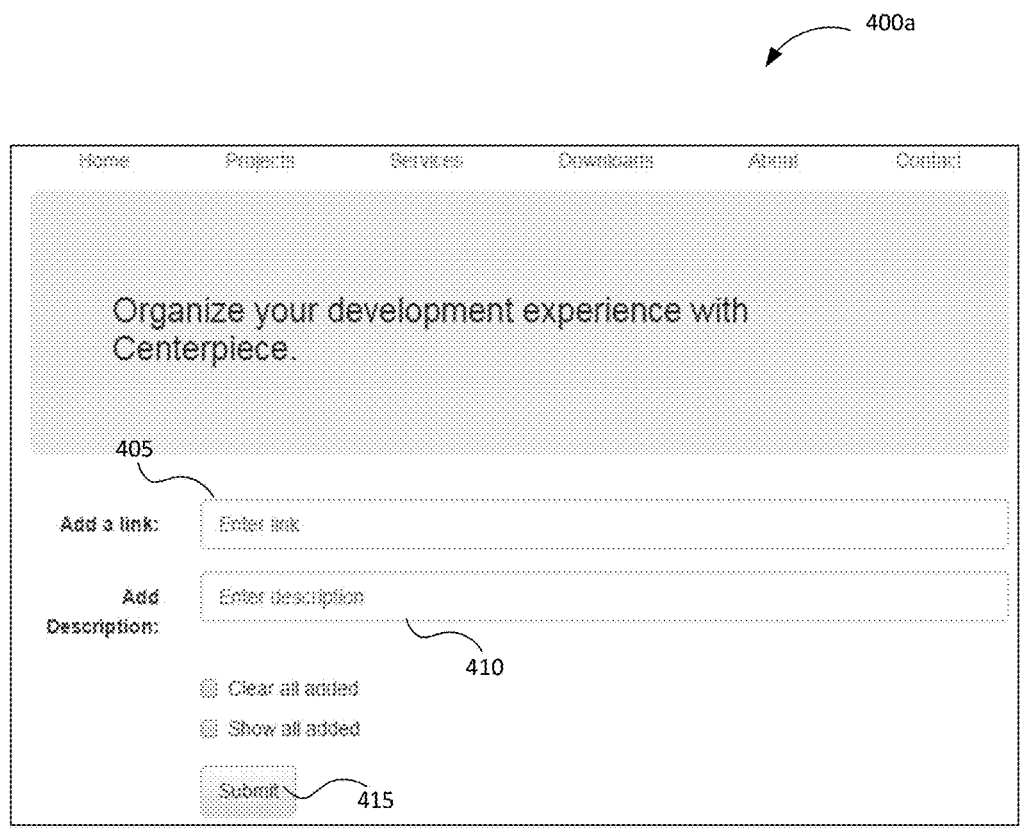
FIGS. 4A, 4B, and 4C illustrate an example user interface for the system for accessing electronic data, according to an example embodiment.
Figure 4B:
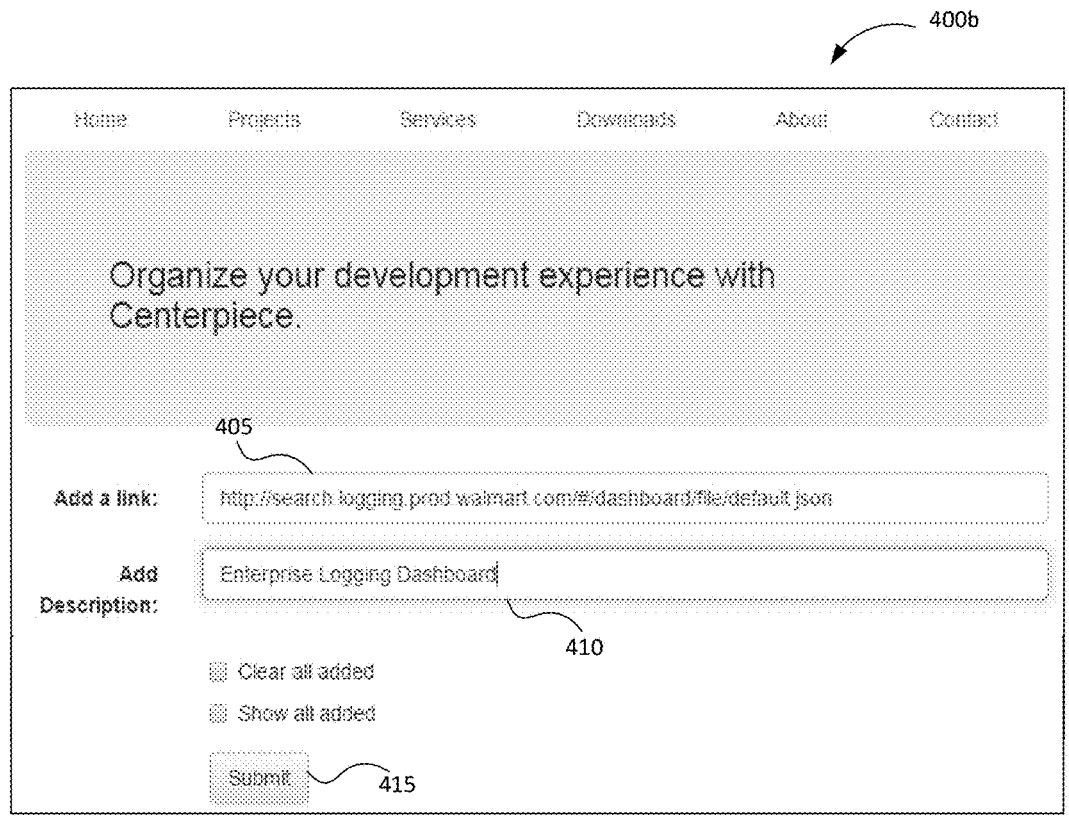
Figure 4C:

FIGS. 4A, 4B, and 4C illustrate exemplary user interfaces for the electronic data access application, according to an example embodiment. Exemplary user interfaces 400*a*, 400*b*, and 400*c* may be generated on a user's client device (e.g., client device 510, 520). FIG. 4A illustrates exemplary user interface 400*a*, and includes an input field 405 and an input field 410. As described above and shown in FIG. 4B, a user can use the input field 405 to enter input such as an URL, a file path and text. As shown in FIG. 4B, the user can use the input field 410 to enter a description corresponding to the input entered in the input field 405. After that, the user can click on button 415 to submit. In response to clicking button 415, as shown in FIG. 4C, the user interface may automatically refresh and display text 420 entered in the description input field 410, and button 425. The text may be displayed together with the display of previously stored input retrieved from the browser cache. As described above, a user can select or click on button 425 to access the electronic data associated with the input entered in input field 405. In this example, the user is able to launch the website associated with the URL entered in input field 405 as shown in FIG. 4B.

Non-limiting Examples of Implementation

In a non-limiting implementation, the electronic data access application is implemented in a tiered-architecture including a presentation tier or layer, an application tier or layer, and a data tier or layer. The presentation layer controls the look and feel of the application and also handles validation and storing data in the local browser cache. The application runs in the application tier. In a web-based implementation of the application, the user enters the application URL in the web browser's address bar on a client device. Data is requested and stored in the local browser cache, and stored and requested via web service calls (for example using Java) to the data tier.

The presentation layer controls the look and feel of the application. Once the user enters the URL into the browser's address bar, the application user interface is the entry point into the electronic data access application. In an example implementation, the electronic data access system may be implemented for a corporation using its intranet or an internal network. In this case, the application is deployed on a central cloud application server. Data requests being sent from the user's web browser are used to communicate with the web services. Saving links and metadata for the electronic data access application are handled by the business tier. Data is requested via web service calls (for example using Java). The business tier communicates with the database for data insert, update, and retrieval. Each tier has individually defined functionality. This architectural design allows the electronic data access system to more efficiently manage each individual tier.

In one embodiment, users enters the electronic data access application URL in their device's web-browser address bar to display the application. The application may run on cloud servers. The user can enter a username and password to be used as the key to link entries in the database. Once logged in, the user's currently stored links are retrieved from the local browser cache and displayed in the user interface. If no links are found in the browser cache, then the electronic data access application searches the remote database for stored links. The user can store new links by entering them in the input fields provided in the graphical user interface and clicking the submit button. The link and accompanying data is stored in the browser cache and persisted with accompanying data in the remote database.

Once a user enters the URL to the application in the web-browser of his or her device, he or she is able to setup a username and password through the user interface, if one has not already been setup. The username may be stored as plain text in the database and the password may be encrypted using AES256 encryption and stored in the database. In one embodiment, the user must enter in the username and password in order to store links or other data in the database. The user credentials are used as the key fields for the application to retrieve data from the database when the user accesses the application on a different device. In an embodiment, the user does not need to supply a username and password in order for the electronic data access application to retrieve the links or other data that are stored in the local browser cache.

As previously discussed, to access the application, the user enters the application URL in the browser's address bar. Once the user enters the application URL, the electronic data access application is visible in the local web browser and available to the user. Also, any links stored in the browser cache are displayed on the user interface screen in the list of links and buttons. The user can also save additional links. The links are saved in the local browser cache immediately and the user interface screen refreshes to show the saved link. If the user also supplies a username and password, the electronic data access application may retrieve the links and other data that are saved in the remote database and associated with that username and password. The user can also use that username and password to store links and other data in the database. This is done by the electronic data access application at the same time as they are saved to the web browser cache. The browser cache records may be stored as JSON objects in the browser cache. In one embodiment, there is also the electronic data access application may identify the total number of records in the browser cache and the amount of memory space available in the browser cache. This information may be used by the electronic data access application to ensure that the stored data is stored consistently without issues due to memory space. In some embodiments the browser record and memory space information may be displayed to the user via the graphical user interface.

The requests from the user's web-browser may be routed to a central cloud application server, where the application is deployed and running. The application may be replicated across n number of servers and redundant across n number of data centers. The application may use AngularJs for the presentation framework and to control majority of the functionality of the application. HTML5 may be used as a markup language to control the appearance of the user interface of the application. Jquery and JavaScript may be used as the scripting languages to handle the user input entered via the user interface (for example, selection of control buttons, entering of text in text fields, etc.). Ajax may be used to invoke the web services to update and retrieve the links and other stored data from the database.

J2EE web services may be used to insert and retrieve the stored links. The web services may be replicated across n number of servers and redundant across n number of data centers. The web services may be used to interact with the application, web browser, and the database. Ajax web service calls may be used to interact with the database. The web services may be used to save links and information to the database and also used to retrieve links and other information from the database.

In one embodiment, web services may provide three operations (GET, POST, DELETE). The GET requests use the database key to retrieve all of the links assigned to that key. The POST requests pull the current data for the key and if the key does not exist then the service creates the key. The key also has a username which is the name that is provided in the username field in the application. The link field is the link to be added to the key. Each key holds a JSON array of links. If a key already exists, then the updated link is appended to the current array of links for that key and saves as the new array. The shared id is used to note if the link can be shared with another user. The DELETE requests pulls the current data for the key and if the key does not exist then the service does not create the key. If the key exists, then the service deletes the requested link from the current array of links and saves the new array.

The databases may be replicated across n number of servers and redundant across n number of data centers. The databases are used to store the links and data for a particular key. By storing the data in an external location, the data may be retrieved by devices other than the device used to save the links in the browser cache.

Links may be stored for an unlimited amount of time, but can be deleted manually by the user. In some embodiments, the electronic data access system is programmed to comply with data retention policies of an organization. In order to comply with the auditing and logging requirements of all pertinent policies, standards, regulations, and laws, all systems (server and devices) and solutions which handle private data, financial data, or private PII (Personally Identifiable Information) are configured to comply with any specifications outlined within a security standard policy for an organization.

In one embodiment, based on an example specification for a security standard policy, all logs are locked down to prevent any modification of the information contained within the logs. Logs are capable of being generated and stored for reporting for a minimum of the last 6 months of activity, with a preference for the last 12 months of activity. If a solution handles Payment Card data, then it provides the information for the last 12 months of activity for the following: all connection activity (logon, logoff), successful or failed, to list the username, time and date, source address of connection, and type of connection; any attempted or successful accesses for write, modify, execute, or delete on a record, successful or failed, to list the username, time and data, type of activity, record being accessed; and all file transfers, attempted or successful to list the username, time and date, item that was transferred.

Data in the local browser cache may be saved for as long as there is enough cache space. The electronic data access application determines the available browser cache space before every insert into cache. If the browser does not have enough space then the application does not save the link until space is available.

Data in the local browser cache may be saved for as long as the cache is recoverable. Most browsers still have the cache records even if the device has been unplugged or offline. Data lost from the browser cache may be recovered from the database if the user chose to store the data in the database. Data stored in the database can be saved for an unlimited time or a user defined time. Data stored in the database may be replicated across multiple servers and redundant across multiple datacenters.

As described above, the electronic data access system may quickly create control buttons to access links stored by the user. For example, in one embodiment, the average response time for a GET request to the database in the electronic data access system is 7 ms to 10 ms. In one embodiment, the average response time for an INSERT request to the database is 7 ms to 14 ms. In one embodiment, the average response time for a DELETE request to the database is 7 ms to 10 ms. In one embodiment, the average response time to retrieve links from the browser cache is 5 ms to 7 ms. In one embodiment, the average response time to save links in the browser cache is 5 ms to 7 ms.

FIG. 5 illustrates a network diagram depicting a system 500 for implementing the electronic data access system, according to an example embodiment. The system 500 can include a network 505, multiple client devices, for example, client device 510, client device 520, server 530, and a database(s) 540. Each of the client devices 510, 520, servers 530, and database(s) 540 is in communication with the network 505.

In an example embodiment, one or more portions of network 505 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The client devices 510, 520 may comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, network PCs, mini-computers, and the like. Each of client devices 510, 520 may connect to network 505 via a wired or wireless connection. Each of client devices 510, 520, may include one or more applications such as, but not limited to, a web browsing application (e.g., browser 615a of computing device 600a shown in FIG. 6A) to enable access to the electronic data access application described herein, file directory or management application, a document editor application, and the like. In an example embodiment, the client devices 510, 520 may perform one or more of the functionalities of the electronic data access system 100 described herein. The client device 510, 520 can include one or more components of computing device 600a of FIG. 6A.

In an example embodiment, the electronic data access system 100 may be included on the server 530, and the server 530 performs one or more of the functionalities of the electronic data access system 100 described herein. In some embodiments, the client devices 510, 520 may perform some of the functionalities, and the server 530 performs the other functionalities described herein. For example, the server 530 may cause the client device 510, 520 to generate the user interface and receive input via the user interface, and to store the entered input in the local browser cache (e.g., browser cache 617a of computing device 600a shown in FIG. 6A) of the client device 510, 520. While server 530 may store the entered input in a remotely-located database (e.g., database 540).

Each of the database(s) 540, and server 530 is connected to the network 505 via a wired connection. Alternatively, one or more of the database(s) 540, and server 530 may be connected to the network 505 via a wireless connection. Server 530 comprise one or more computers or processors configured to communicate with client devices 510, 520 via network 505. The server 530 can include one or more components of server 600b of FIG. 6B. Server 530 hosts one or more applications or web sites (for example, the electronic data access application described herein) accessed by client devices 510, 520 and/or facilitates access to the content of database(s) 540. Database(s) 540 comprise one or more storage devices for storing data and/or instructions (or code) for use by server 530, and/or client devices 510, 520. Database(s) 540 and server 530 may be located at one or more geographically distributed locations from each other or from client devices 510, 520. Alternatively, database(s) 540 may be included within server 530.

Figure 6A:
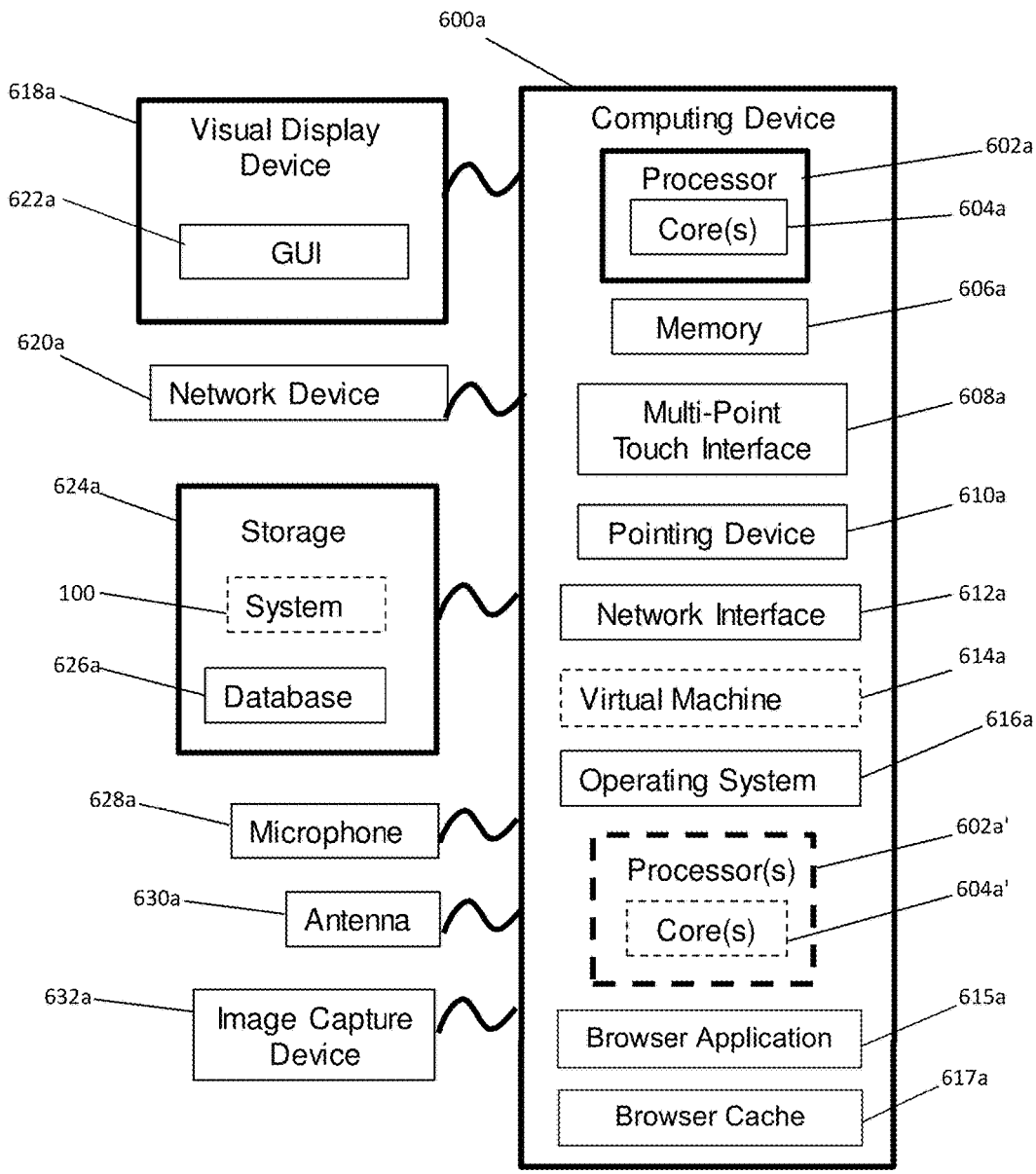
FIG. 6A is a block diagram of an exemplary computing device that may be used to implement exemplary embodiments described herein.

FIG. 6A is a block diagram of an exemplary computing device 600a that can be used to perform one or more steps of the methods provided by exemplary embodiments. The computing device 600a includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606a included in the computing device 600a can store computer-readable and computer-executable instructions or software for implementing exemplary embodiments. The computing device 600a also includes processor 602a and associated core 604a, and optionally, one or more additional processor(s) 602a' and associated core(s) 604a' (for example, in the case of computer systems having multiple processors/cores), for executing computer-readable and computer-executable instructions or software stored in the memory 606a and other programs for controlling system hardware. Processor 602a and processor(s) 602a' can each be a single core processor or multiple core (604a and 604a') processor.

The computing device 600a also includes a browser application 615 and a browser cache 617a. As described above, the browser application 615a can enable a user to access the (web-based) electronic data access application. As described above, in some embodiments, the electronic data access system 100 stores data and entered input in the browser cache 617a.

Virtualization can be employed in the computing device 600a so that infrastructure and resources in the computing device can be shared dynamically. A virtual machine 614a can be provided to handle a process running on multiple processors so that the process appears to be using only one computing resource rather than multiple computing resources. Multiple virtual machines can also be used with one processor.

Memory 606a can include a computer system memory or random access memory, such as DRAM, SRAM, EDO RAM, and the like. Memory 606a can include other types of memory as well, or combinations thereof.

A user can interact with the computing device 600a through a visual display device 618a, such as a touch screen display or computer monitor, which can display one or more user interfaces 619a that can be provided in accordance with exemplary embodiments, for example, the exemplary user interfaces illustrated in FIGS. 4A, 4B and 4C. The visual display device 618a can also display other aspects, elements and/or information or data associated with exemplary embodiments. The computing device 600a can include other I/O devices for receiving input from a user, for example, a keyboard or any suitable multi-point touch interface 608a, a pointing device 610a (e.g., a pen, stylus, mouse, or trackpad). The keyboard 608a and the pointing device 610a can be coupled to the visual display device 618a. The computing device 600a can include other suitable conventional I/O peripherals.

The computing device 600a can also include one or more storage devices 624a, such as a hard-drive, CD-ROM, or other computer readable media, for storing data and computer-readable instructions and/or software, such as one or more modules of the system 100 shown in FIG. 1 that implements exemplary embodiments of the electronic data access system as described herein, or portions thereof, which can be executed to generate user interface 619a on display 618a. Exemplary storage device 624a can also store one or more databases for storing any suitable information required to implement exemplary embodiments. The databases can be updated by a user or automatically at any suitable time to add, delete or update one or more items in the databases. Exemplary storage device 624a can store one or more databases 626a for storing input entered by the user via the electronic data access application, user credentials, user profile information, and any other data/information used to implement exemplary embodiments of the systems and methods described herein.

The computing device 600a can include a network interface 612a configured to interface via one or more network devices 622a with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612a can include a built-in network adapter, network interface card, PCMCIA network card, card bus network adapter, wireless network adapter, USB network adapter, modem or any other device suitable for interfacing the computing device 600a to any type of network capable of communication and performing the operations described herein. Moreover, the computing device 600a can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 600a can run any operating system 616a, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 616a can be run in native mode or emulated mode. In an exemplary embodiment, the operating system 616a can be run on one or more cloud machine instances.

Figure 6B:
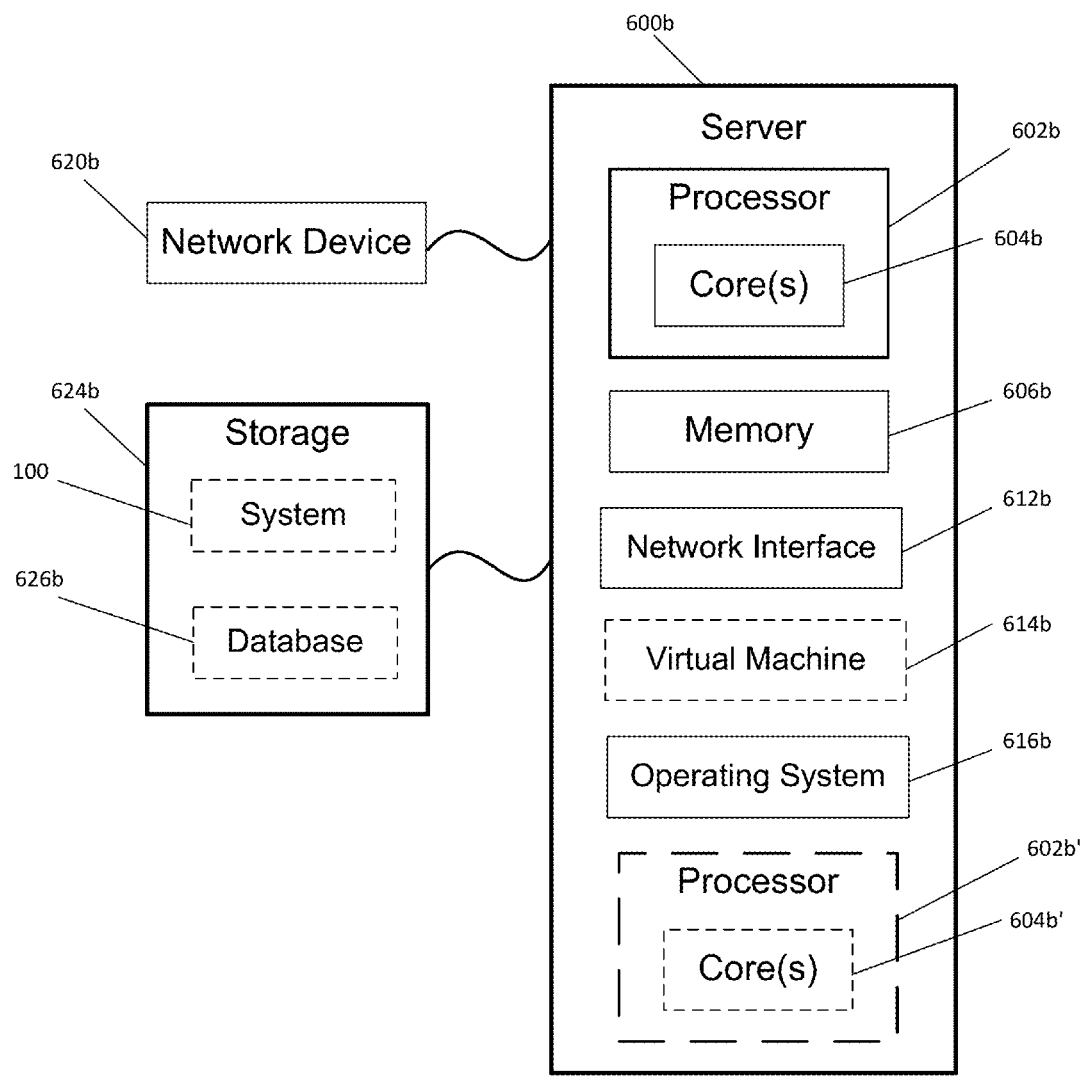
FIG. 6B is a block diagram of an exemplary server that may be used to implement exemplary embodiments described herein.

FIG. 6B is a block diagram of an exemplary server 600b that can be used to perform one or more steps of the methods provided by exemplary embodiments. The server 600b includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 606b included in the server 600b can store computer-readable and computer-executable instructions or software for implementing exemplary embodiments. The server 600b also includes processor 602b and associated core 604b, and optionally, one or more additional processor(s) 602b' and associated core(s) 604b' (for example, in the case of computer systems having multiple processors/cores), for executing computer-readable and computer-executable instructions or software stored in the memory 606b and other programs for controlling system hardware. Processor 602b and processor(s) 602b' can each be a single core processor or multiple core (604b and 604b') processor.

Virtualization may be employed in the server 600b so that infrastructure and resources in the server can be shared dynamically. A virtual machine 614b can be provided to handle a process running on multiple processors so that the process appears to be using only one computing resource rather than multiple computing resources. Multiple virtual machines can also be used with one processor.

Memory 606b can include a computer system memory or random access memory, such as DRAM, SRAM, EDO RAM, and the like. Memory 606b can include other types of memory as well, or combinations thereof.

The server 600b can also include or be coupled to one or more storage devices 624b, such as a hard-drive, CD-ROM, or other computer readable media, for storing data and computer-readable instructions and/or software, such as one or more modules of the system 100 shown in FIG. 1 that implements exemplary embodiments of the electronic data access system as described herein, or portions thereof. Exemplary storage device 624b may also store one or more databases 626b for storing any suitable information required to implement exemplary embodiments. The databases 626b can be updated by a user or automatically at any suitable time to add, delete or update one or more items in the databases. Exemplary storage device 624a can store one or more databases 626b for storing input entered by the user via the electronic data access application, user credentials, user profile information, and any other data/information used to implement exemplary embodiments of the systems and methods described herein.

The server 600b can include a network interface 612b configured to interface via one or more network devices 622b with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 612b can include a built-in network adapter, network interface card, PCMCIA network card, card bus network adapter, wireless network adapter, USB network adapter, modem or any other device suitable for interfacing the server 600b to any type of network capable of communication and performing the operations described herein. Moreover, the server 600b can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The server 600b can run any operating system 616b, such as any of the versions of the Microsoft® Windows® operating systems, the different releases of the Unix and Linux operating systems, any version of the MacOS® for Macintosh computers, any server operating systems, any embedded operating system, any real-time operating system, any open source operating system, any proprietary operating system, any operating systems for mobile computing devices, or any other operating system capable of running on the computing device and performing the operations described herein. In exemplary embodiments, the operating system 616b can be run in native mode or emulated mode.

In an exemplary embodiment, the operating system 616b can be run on one or more cloud machine instances.

In an example embodiment, the electronic data access system stores embedded data, such as metadata and cookies, associated with a URL link. By storing the embedded data associated with an URL link, the system enables a user to click on the URL link and access it through a Proxy, Tor-Onion router, or other private browsing mechanisms so that user activity at that URL is anonymous from third-party (such as government or corporate) tracking. Storing embedded data associated with an URL link also enables the system to save the user's preferences specific to that URL without cross pollination across other URLs.

Additionally, in this embodiment, the electronic data access system can store credentials for an URL link, and the system can assist a user with automatically signing on to a website or accessing a document. In this manner, the system can assist with auto-filling credentials where appropriate without storing the credentials locally to the browser. Moreover, the stored credentials can be accessed via multiple client devices.

In some embodiments, the electronic data access system can add functionality to an organization's Intranet (or portal system) used by employees or users of an organization to access organization related data. The system may automatically store specific files and URL links for a user based on the user's role or title within the organization, and store data entered by the user for future use. In an example embodiment, the electronic data access system provides a "guest" mode that allows new users that do not have a user login for the electronic data access system to access a predefined set of electronic data. The guest mode may be used by organizations for training new employees or users, and may be configured so that the new user follows a predefined path of access to electronic data.

Figure 7:
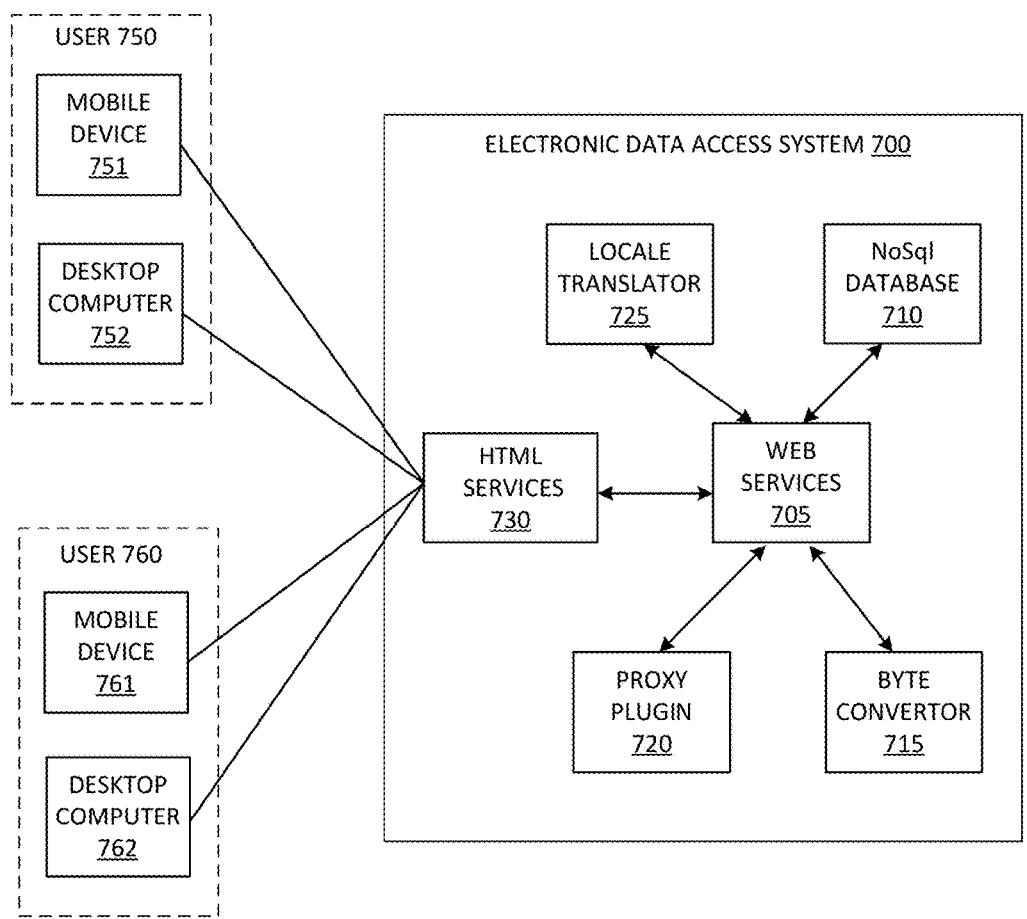
FIG. 7 is a block diagram showing an exemplary electronic data access system 700, according to an example embodiment.

FIG. 7 is a block diagram showing an exemplary electronic data access system 700, according to an example embodiment. As shown, the electronic data access system includes multiple components which may be implemented in software code. The multiple components include web services 705, NoSql database 710, byte convertor 715, proxy plugin 720, locale translator 725, and HTML services 730. Each of the components NoSql database 710, byte convertor 715, proxy plugin 720, locale translator 725, and HTML services 730 is in communication with web services 705. HTML services 730 communicates to the user devices (for example, 751, 752, 761, 762) and provides a user interface for the electronic data access system 700 to the devices.

The web services component 705 is configured for machine-to-machine communication, for example, transferring machine readable file formats such as XML and JSON. Web services 705 may be configured to provide an object-oriented web-based interface to a database server utilized by another web server or application to provide an user interface to a user. The web services 705 may be configured to consume several web services and compile the content into one user interface. In an example embodiment, web services 705 is implemented in JAVA. In an example embodiment, web services 705 employs REST (Representational state transfer) web services to allow requesting systems to access and manipulate textual representation of web resources using a uniform and predefined set of stateless operations.

The NoSql database 710 is configured to provide a noSql, non SQL, non-relational database for storage and retrieval of data which is modeled in means other than the tabular relations used in relational database. The noSql database is built to allow insertion of data without a predefined schema, which allows for significant application changes in real-time without service interruptions. An example noSql database stores data in one table, rather than in multiple tables that have to be related by keys. An example noSql database is illustrated and described with respect to FIG. 8. A noSql database enables faster read and write access and easier duplication without locks, when compared to a SQL database.

In certain countries, websites and data on the Internet is provided in double-byte format. In the double byte format, each character is encoded in two bytes, or each graphic character not representable by a single byte character is encoded in two bytes. Example countries that use the double byte format include, but is not limited to, Japan, China, and Korea. The byte convertor 715 is configured to convert data from a single byte format to a double byte format to enable a user in a country using double byte format to view and access electronic data via the electronic data access system 700. Similarly, the byte convertor 715 is configured to convert data from a double byte format to a single byte format to enable a user in a country using single byte format to view and access electronic data via the electronic data access system 700. The byte convertor 715 may convert data such as URL links, embedded data, meta data, text, etc. The byte convertor 715 is configured to automatically read data from and write data to a user device.

The proxy plugin component 720 is configured to provide private browsing capabilities to a user of the electronic data access system 700. The proxy plugin 720 enables a user to click on the URL link and access it through a Proxy, Tor-Onion router, or other private browsing mechanisms so that user activity at that URL is maintained private and anonymous from third-party (such as government or corporate) tracking.

The locale translator component 725 is configured to translate electronic data on the Internet. For example, the locale translator 725 can translate a description of an URL link, and translate text at a destination device (that is, the user's device, for example, mobile device 751). The locale translator 725 may translate data into other languages or formats based on user preferences or based on the user device's settings or location.

The HTML server component 730 is configured to generate and host the HTML webpage user interface for the electronic data access system described herein. The HTML server 730 generates the user interface for the webpage based on the data compiled by the web services component 705. The HTML server 730 also adds a security layer between the user's devices 751, 752, 761, 762 and the web service component 705.

As described above, the electronic data access system is configured to remotely store electronic data, including embedded data, in the system, rather than locally at a device's browser. This feature of the electronic data access system enables a user to access the saved electronic data and embedded data if needed from multiple devices. The electronic data access system 700 enables users, for example user 750 and user 760, to save and access electronic data over multiple devices. For example, mobile device 751 and desktop computer 752 may be associated with user 750. User 750 may save electronic data using the system 700 via mobile device 751, and subsequently the system 700 enables the user 750 to access the saved electronic data on desktop computer 752. Similarly, mobile device 761 and desktop computer 762 may be associated with user 760. User 760 may save electronic data using the system 700 via desktop computer 762, and subsequently the system 700 enables the user 760 to access the saved electronic data on mobile device 761. Additionally, user 750 can share electronic data with user 760 using the electronic data access system 700.

FIG. 8 illustrates an exemplary data structure 800 for the electronic data access system, according to an example embodiment. In an example embodiment, the electronic data access system employs a noSql database. As shown in FIG. 8, the data structure stores data on various attributes for each electronic data item stored by the user using the electronic data access system described herein. The data structure stores data within the following fields: type link, double byte, metadata and shared access. The data structure may store additional data or information under additional fields not illustrated in FIG. 8. Under the type link field, the data structure 800 stores information on plugins used or associated with the corresponding electronic data item. For example, data item 1 uses plugin 1, while data item 2 uses plugin 2. Data items 3-7, for example, do not use a plugin. When the user clicks on the button to access an electronic data item (for example, button 425 of FIG. 4C), using the data stored in the type link field, the electronic data access system can automatically execute the associated plugin (according to the type link field). Example plugins may include services such as, but not limited to, single sign-on, proxy links, Tor onion routing that enables users to communicate anonymously on the Internet, virtual private network (VPN), and others.

Under the double byte field, the data structure 800 stores data indicating whether the corresponding electronic data item is in double byte format. For example, data items 1, 4 and 7 are indicated as being in double-byte format. Under the metadata fields, the data structure 800 stores metadata that may include credentials for automatic log-in or sign-in for websites or other electronic data. Under the metadata fields, the data structure 800 may also store proxy address information and cookies related to the corresponding electronic data item. As shown, data structure 800 may include multiple metadata fields to store various metadata, including cookies, credentials, proxy address etc., related to electronic data items stored by the user.

Under the shared access field, the data structure 800 stores information related to electronic data items that are shared with the user by another user. For example, data item 3 is shared with the user by User 1. The shared access field stores a username of User 1, time and date the electronic data item is shared, and other information. As another example, data item 5 is shared with the user by User 2. The shared access field stores a username of User 2, time and date the electronic data item is shared, and other information.

As shown, some fields in data structure 800 may not contain data. The data structure 800 may be stored in database 540 of FIG. 5. In this manner, the electronic data access system is configured to store electronic data, including embedded data, in the system, rather than locally at a device's browser. This feature of the electronic data access system enables a user to access the saved electronic data and embedded data at multiple devices.

The following description is presented to enable any person skilled in the art to create and use a computer system configuration and related method and systems for improving access to electronic data. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. A method for improving access to electronic data, the method comprising:
    providing a server-based application that generates a graphical user interface for display on a first client device requesting the server-based application via a web browser on the first client device;
    receiving credentials from a user of the first client device with the graphical user interface;
    receiving, after an authorization of the user credentials, input from the user of the first client device via the graphical user interface, the graphical user interface configured to accept input indicating an URL for a website, a file path for a document, and text;
    storing the entered input in a local browser cache on the first client device and in a remotely-located database, the input stored in the remotely located database being associated with the user credentials;
    providing subsequently, a display generated by the server-based application of electronic data related to the stored input;
    determining programmatically that a second client device is configured to use data in single or double byte format; and
    converting programmatically the stored input from single byte format to double byte format or from double byte format to single byte format based on the determined configuration of the second client device.

2. The method of claim 1, wherein the stored input is accompanied by a user-supplied description.

3. The method of claim 1, wherein the user credentials include a username and password.

4. The method of claim 1, further comprising:
    generating the graphical user interface on a second client device requesting the server-based application;
    receiving the user credentials of the user of the first client device via the graphical user interface;
    querying the database to retrieve data associated with the user credentials; and
    providing a display generated by the server-based application of the retrieved data on the second client device.

5. The method of claim 1, wherein the stored input is an URL for a website and the subsequent display of data includes a control button that launches the website in response to a selection of the control button.

6. The method of claim 1, wherein the entered input is a file path for a document and the subsequent display of data includes a control button that opens the document in response to a selection of the control button.

7. The method of claim 1, wherein the entered input is text and the subsequent display of data includes a control button that displays the text in response to a selection of the control button.

8. The method of claim 1, further comprising:
    determining that the browser cache has reached a memory limit;
    clearing data stored in the browser cache based on the determining; and
    storing a database key in the browser cache, the database key pointing to a record where the cleared data is stored in the remotely-located database.

9. The method of claim 1, further comprising:
    receiving user credentials via the graphical user interface on the first client device; and
    retrieving data from the remotely located database and storing it in the browser cache of the first client device to replace missing data.

10. A system for providing access to electronic data, the system comprising:
    a processor;
    a memory in communication with the processor and storing instructions to cause the processor to:
        provide a server-based application that generates a graphical user interface for display on a first client device requesting the server-based application via a web browser on the first client device;
        receive credentials from a user of the first client device with the graphical user interface;
        receive, after an authorization of the user credentials, input from the user of the first client device via the graphical user interface, the graphical user interface configured to accept input indicating an URL for a website, a file path for a document, and text;
        store the entered input in a local browser cache on the first client device and in a remotely-located database, the input stored in the remotely located database being associated with the user credentials;
        provide subsequently, a display generated by the server-based application of electronic data related to the stored input:
    determine programmatically that a second client device is configured to use data in single or double byte format; and
    convert programmatically the stored input from single byte format to double byte format or from double byte format to single byte format based on the determined configuration of the second client device.

11. The system of claim 10, wherein the stored input is accompanied by a user-supplied description.

12. The system of claim 10, wherein the user credentials include a username and password.

13. The system of claim 10, further comprising:
an additional processor; and
an additional memory in communication with the additional processor and storing instructions to cause the additional processor to:
generate the graphical user interface on a second client device requesting the server-based application;
receive the user credentials of the user of the first client device via the graphical user interface;
query the database to retrieve data associated with the user credentials; and
provide a display generated by the server-based application of the retrieved data on the second client device.

14. The system of claim 10, wherein the stored input is an URL for a website and the subsequent display of data includes a control button that launches the website in response to a selection of the control button.

15. The system of claim 10, wherein the stored input is a file path for a document and the subsequent display of data includes a control button that opens the document in response to a selection of the control button.

16. The system of claim 10, wherein the stored input is text and the subsequent display of data includes a control button that displays the text in response to a selection of the control button.

17. The system of claim 10, wherein the processor is further caused to:
determine that the browser cache has reached a memory limit;
clear data stored in the browser cache based on the determining; and
store a database key in the browser cache, the database key pointing to a record where the cleared data is stored in the remotely-located database.

18. The system of claim 10, wherein the processor is further caused to:
receive user credentials via the graphical user interface on the first client device; and
retrieve data from the remotely located database and storing it in the browser cache of the first client device to replace missing data.

19. A non-transitory computer readable medium storing instructions that when executed by a processor causes the processor to implement a method for providing access to electronic data, the method comprising:
providing a server-based application that generates a graphical user interface for display on a first client device requesting the server-based application via a web browser on the first client device;
receiving credentials from a user of the first client device with the graphical user interface;
receiving, after an authorization of the user credentials, input from the user of the first client device via the graphical user interface, the graphical user interface configured to accept input indicating an URL for a website, a file path for a document, and text;
storing the entered input in a local browser cache on the first client device and in a remotely-located database, the input stored in the remotely located database being associated with the user credentials;
providing subsequently, a display generated by the server-based application of electronic data related to the stored input;
determining programmatically that a second client device is configured to use data in single or double byte format; and
converting programmatically the stored input from single byte format to double byte format or from double byte format to single byte format based on the determined configuration of the second client device.

* * * * *